(12) United States Patent
Murakami

(10) Patent No.: US 12,164,815 B2
(45) Date of Patent: Dec. 10, 2024

(54) IMAGE FORMING APPARATUS, INSPECTION APPARATUS, INSPECTION SYSTEM, AND INSPECTION METHOD

(71) Applicant: CANON KABUSHIKI KAISHA, Tokyo (JP)

(72) Inventor: Katsuyuki Murakami, Chiba (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 18/343,385

(22) Filed: Jun. 28, 2023

(65) Prior Publication Data

US 2024/0004591 A1 Jan. 4, 2024

(30) Foreign Application Priority Data

Jun. 30, 2022 (JP) .................................. 2022-105512

(51) Int. Cl.
*G06F 3/12* (2006.01)
*H04N 1/00* (2006.01)

(52) U.S. Cl.
CPC .......... *G06F 3/1205* (2013.01); *G06F 3/1245* (2013.01); *H04N 1/00018* (2013.01); *H04N 1/00045* (2013.01)

(58) Field of Classification Search
CPC .... G06F 3/1205; G06F 3/1244; G06F 3/1245; G06F 3/1247; G06F 3/1248; H04N 1/00018; H04N 1/00045; H04N 2201/3216; H04N 2201/3232
USPC ........................................................ 358/1.13
See application file for complete search history.

(56) References Cited

U.S. PATENT DOCUMENTS

2020/0019353 A1* 1/2020 Okajima ............... G06F 3/1257
2021/0067649 A1* 3/2021 Okajima ............ H04N 1/00639

FOREIGN PATENT DOCUMENTS

JP 2021196310 A 12/2021

* cited by examiner

*Primary Examiner* — Kent Yip
(74) *Attorney, Agent, or Firm* — Canon U.S.A., Inc. IP Division

(57) ABSTRACT

An inspection apparatus includes a controller having one or more processors and one or more memories. The controller is configured to receive a plurality of image files. Each image file represents one page. Each image file is provided with a page number. The controller is also configured to receive page order information of the image files and to rearrange the image files based on the received page order information and the respective page number provided to each image file. The controller is also configured to register the rearranged image files as a correct image for inspection.

12 Claims, 10 Drawing Sheets

FIG. 9

```
Print settings for imposition processing                    ~900

Paper size:          [  A4        ▽] ~901

┌─Output destination─────────┐
    │  ◉ Stacking unit           │ ~902
    │  ◎ Tray unit               │
    └────────────────────────────┘

┌─Output side────────────────┐
    │  ◉ Face down               │ ~903
    │  ◎ Face up                 │
    └────────────────────────────┘

┌─Print order────────────────┐
    │  ◉ Normal order            │ ~904
    │  ◎ Reverse order           │
    └────────────────────────────┘

┌─Print side─────────────────┐
    │  ◉ Both sides              │ ~905
    │  ◎ One side                │
    └────────────────────────────┘

┌─Binding direction in two-sided printing─┐
    │  ◉ Long-edge binding                    │ ~906
    │  ◎ Short-edge binding                   │
    └─────────────────────────────────────────┘

Number of
pages to read:   [   16   ] ~907

908                  909
   [  OK  ]           [ Cancel ]
```

FIG. 10

| Print settings | | | | | | Imposition rules | | | | |
|---|---|---|---|---|---|---|---|---|---|---|
| Print side | Paper size (transport direction base) | Binding direction | Output side | Print order | Number of turns | Print side | Preferred side | Imposition order | Front side rotation | Back side rotation |
| One side | Short edge | Long edge | FD | Normal order | 1 | One side | Front side | Ascending order | 0 | 180 |
| One side | Short edge | Long edge | FD | Reverse order | 1 | One side | Front side | Descending order | 0 | 180 |
| One side | Short edge | Long edge | FU | Normal order | 1 | One side | Back side | Ascending order | 0 | 180 |
| One side | Short edge | Long edge | FU | Reverse order | 1 | One side | Back side | Descending order | 0 | 180 |
| One side | Short edge | Long edge | FD | Normal order | 2 | One side | Back side | Ascending order | 0 | 180 |
| One side | Short edge | Long edge | FD | Reverse order | 2 | One side | Back side | Descending order | 0 | 180 |
| One side | Short edge | Long edge | FU | Normal order | 2 | One side | Front side | Ascending order | 0 | 180 |
| One side | Short edge | Long edge | FU | Reverse order | 2 | One side | Front side | Descending order | 0 | 180 |
| One side | Short edge | Short edge | FD | Normal order | 1 | One side | Front side | Ascending order | 90 | 90 |
| One side | Short edge | Short edge | FD | Reverse order | 1 | One side | Front side | Descending order | 90 | 90 |
| One side | Short edge | Short edge | FU | Normal order | 1 | One side | Back side | Ascending order | 90 | 90 |
| One side | Short edge | Short edge | FU | Reverse order | 1 | One side | Back side | Descending order | 90 | 90 |
| One side | Short edge | Short edge | FD | Normal order | 2 | One side | Back side | Ascending order | 270 | 270 |
| One side | Short edge | Short edge | FD | Reverse order | 2 | One side | Back side | Descending order | 270 | 270 |
| One side | Short edge | Short edge | FU | Normal order | 2 | One side | Front side | Ascending order | 270 | 270 |
| One side | Short edge | Short edge | FU | Reverse order | 2 | One side | Front side | Descending order | 270 | 270 |
| One side | Long edge | Long edge | FD | Normal order | 1 | One side | Front side | Ascending order | 90 | 90 |
| One side | Long edge | Long edge | FD | Reverse order | 1 | One side | Front side | Descending order | 90 | 90 |
| One side | Long edge | Long edge | FU | Normal order | 1 | One side | Back side | Ascending order | 90 | 90 |
| One side | Long edge | Long edge | FU | Reverse order | 1 | One side | Back side | Descending order | 90 | 90 |
| One side | Long edge | Long edge | FD | Normal order | 2 | One side | Back side | Ascending order | 270 | 270 |
| One side | Long edge | Long edge | FD | Reverse order | 2 | One side | Back side | Descending order | 270 | 270 |
| One side | Long edge | Long edge | FU | Normal order | 2 | One side | Front side | Ascending order | 270 | 270 |
| One side | Long edge | Long edge | FU | Reverse order | 2 | One side | Front side | Descending order | 270 | 270 |
| One side | Long edge | Short edge | FD | Normal order | 1 | One side | Front side | Ascending order | 0 | 180 |
| One side | Long edge | Short edge | FD | Reverse order | 1 | One side | Front side | Descending order | 0 | 180 |
| One side | Long edge | Short edge | FU | Normal order | 1 | One side | Back side | Ascending order | 0 | 180 |
| One side | Long edge | Short edge | FU | Reverse order | 1 | One side | Back side | Descending order | 0 | 180 |
| One side | Long edge | Short edge | FD | Normal order | 2 | One side | Back side | Ascending order | 0 | 180 |
| One side | Long edge | Short edge | FD | Reverse order | 2 | One side | Back side | Descending order | 0 | 180 |
| One side | Long edge | Short edge | FU | Normal order | 2 | One side | Front side | Ascending order | 0 | 180 |
| One side | Long edge | Short edge | FU | Reverse order | 2 | One side | Front side | Descending order | 0 | 180 |
| Both sides | Short edge | Long edge | FD | Normal order | 1 | Both sides | Front side | Ascending order | 0 | 180 |
| ⋮ | ⋮ | ⋮ | ⋮ | ⋮ | ⋮ | ⋮ | ⋮ | ⋮ | ⋮ | ⋮ |
| Both sides | Long edge | Short edge | FU | Reverse order | 2 | Both sides | Front side | Descending order | 0 | 180 |

IMAGE FORMING APPARATUS, INSPECTION APPARATUS, INSPECTION SYSTEM, AND INSPECTION METHOD

BACKGROUND

Field

The present disclosure relates to an image forming apparatus, an inspection apparatus, an inspection system, and an inspection method.

Description of the Related Art

Previously, manual inspection had been carried out to check printouts. However, in recent years, apparatuses for inspecting printouts automatically as post-processing that takes place after processing with printers is completed, have been used. With this kind of product inspection apparatus, in a first step, correct image data is registered. Subsequently, source image data is printed on a sheet using an image forming apparatus, and the data printed on the sheet is read by an image reading device that is configured in the product inspection apparatus. In some implementations, such an inspection apparatus is capable of real time processing. With the use of the inspection apparatus capable of real time processing, the image data read by the image reading device can be compared to the correct image data registered in the first step so as to detect defective images on printouts. Such an inspection process for detecting defective images on printouts is referred to as print image inspection. Using such techniques, correct image data can be generated.

Another method of generating correct image data using an inspection apparatus is disclosed in Japanese Patent Laid-Open No. 2021-196310 (Patent literature 1). Patent literature 1 presents a method in which print data is converted into image data, and the converted image data is subjected to rearranging in the order of printing, according to print settings; as a result, correct image data matching the data read by an image reading device is generated. The image processing of converting print data or document data to bitmapped image data is called raster image processor (RIP) processing. When RIP processing for generating correct images is performed by a device other than a printer, because the amount of data and amount of processing can differ for different individual pages, the timing of the end of processing can also vary among the individual pages. As a result, correct image data items generated by RIP processing can be generated in a wrong order of pages.

SUMMARY

Various embodiments of the present disclosure address situations where such malfunction occurs when inspection setup is performed with an inspection apparatus. Other embodiments address situations where the image read by an image reading device does not match any image, and thus intended product inspection cannot be provided. An inspection apparatus according to various embodiments of the present disclosure includes a controller having one or more processors and one or more memories. The controller is configured to receive a plurality of image files. Each image file represents one page and is provided with a page number. The controller is also configured to receive page order information of the image files and to rearrange the image files based on the received page order information and the respective page number provided to each image file. The controller is also configured to register the rearranged image files as a correct image for inspection.

Further features of the present disclosure will become apparent from the following description of exemplary embodiments with reference to the attached drawings.

BRIEF DESCRIPTION OF THE DRAWINGS

FIG. 9 is an example of a UI screen for configuring settings for imposition processing according to the second embodiment.

FIG. 10 is an example of an imposition rule correspondence table according to the second embodiment.

DESCRIPTION OF THE EMBODIMENTS

Hereinafter, embodiments of the present disclosure will be described with reference to the drawings. It should be noted that the constituent elements described in the embodiments are merely examples and not intended to limit the scope of the present invention.

Figure 1:
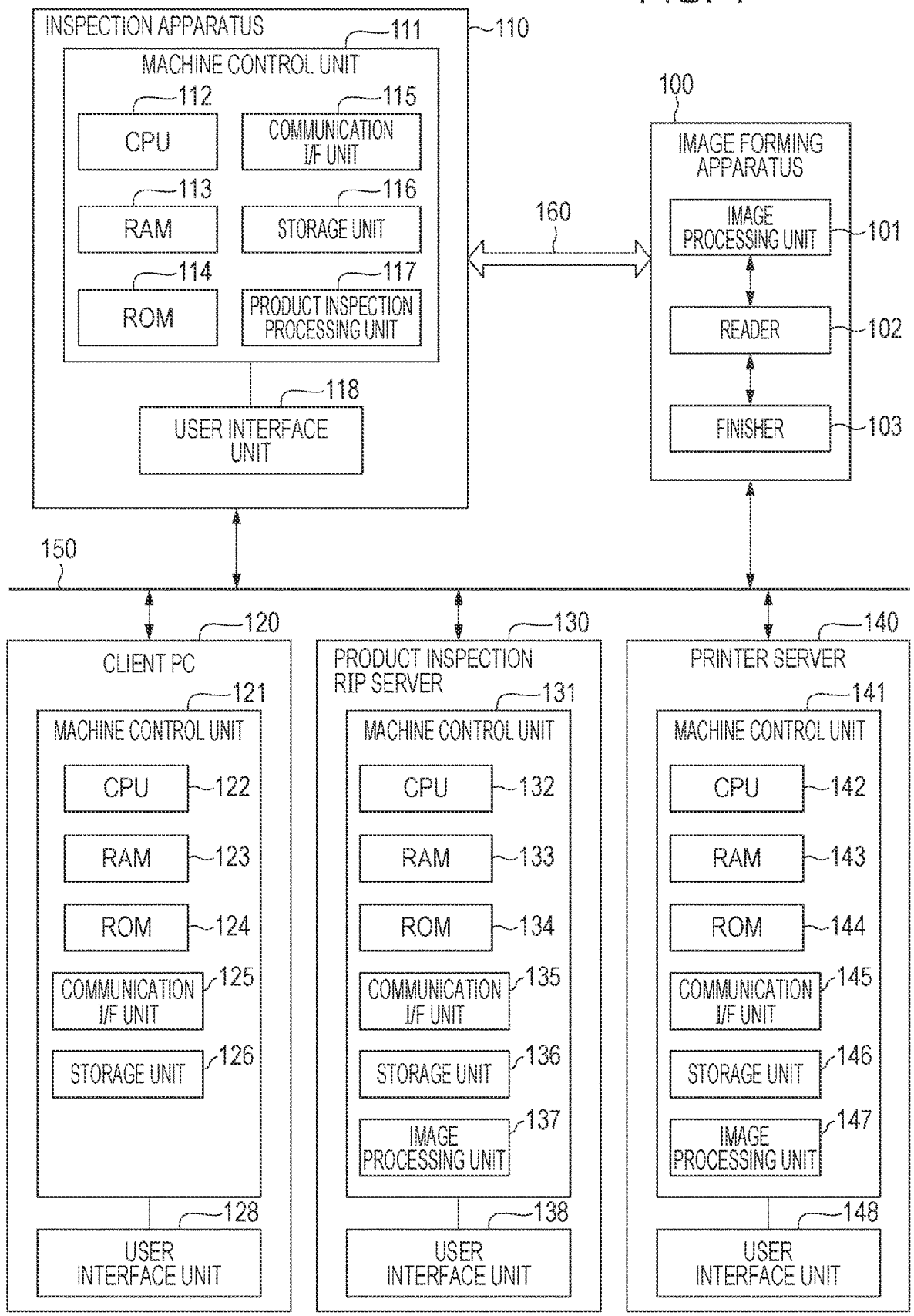
FIG. 1 illustrates an example of an overall configuration of a product inspection system according to a first embodiment.

FIG. 1 illustrates an entire system configuration including an inspection apparatus, according to a first embodiment of the present disclosure. This system is constituted by an image forming apparatus 100, an inspection apparatus 110, a client personal computer (PC) 120, a product inspection raster image processor (RIP) server 130, a printer server 140, a network 150, and a communication cable 160. This system is referred to as an inspection system.

The image forming apparatus 100 prints based on various kinds of input data such as print data transmitted from the client PC 120 or the printer server 140. The image forming apparatus 100 includes an image processing unit 101, a reader 102, and a finisher 103. The image processing unit 101, the reader 102, and the finisher 103 are coupled to each other via a communication cable that is an internal bus.

The image processing unit 101 performs image processing of various kinds of input data in accordance with print settings and outputs a processed image as a printout.

The reader 102 receives the printout outputted by the image processing unit 101 and obtains image data to be used to inspect the received printout with respect to whether any defective image exists. As used herein, a defective image is an image that degrades the quality of printouts. Examples of a defective image include a circular defective image (a spot) appearing because a color material stuck in an unintended part in the printing process and a faded, linear defective image (a streak) appearing because an adequate amount of color material was not applied to an intended part. The obtained image data is transferred to the inspection apparatus 110 described later through the communication cable 160 and inspected with the inspection apparatus 110 with respect to whether any defective image exists on a printout. The reader 102 accordingly obtains the inspection result from the inspection apparatus 110.

The finisher 103 receives the output sheet scanned by the reader 102. Based on the inspection result from the inspection apparatus 110, the finisher 103 changes the output destination, and when necessary, carries out post-processing (for example, bookbinding).

The image forming apparatus 100 is coupled to the inspection apparatus 110, the client PC 120, the product inspection RIP server 130, and the printer server 140 through the network 150. The image forming apparatus 100 is coupled to the inspection apparatus 110 via the communication cable 160, and the image forming apparatus 100 communicates with the inspection apparatus 110 to exchange, for example, image data for product inspection and an inspection result. In the present embodiment, product inspection is carried out with the inspection apparatus 110, but the present embodiment should not be interpreted as limiting; product inspection may be carried out with, for example, an in-line product inspection machine for performing image forming, product inspection, post-processing, and delivery in an integrated manner. Details of the configuration of the image forming apparatus 100 according to the present embodiment will be described later.

The inspection apparatus 110 is a personal computer for inspecting an image that is read based on a printout using the reader 102. The inspection apparatus 110 includes a machine control unit 111 and a user interface unit 118 (a user interface unit is hereinafter referred to as a UI unit). The machine control unit 111 is implemented with a controller board, on which a central processing unit (CPU) 112, a random-access memory (RAM) 113, a read-only memory (ROM) 114, a communication interface (I/F) unit 115, a storage unit 116, and a product inspection processing unit 117 are mounted. In the present embodiment, communication among the modules is implemented using an internal system bus (not illustrated).

The CPU 112, in accordance with an initial program in the storage unit 116, reads a main program from the storage unit 116 and loads the main program on the RAM 113. The RAM 113 is usable as program storage and work main memory. The ROM 114 is usable to temporarily store data created during the processing with programs. The communication I/F unit 115 is usable when communication through the network 150 and the communication cable 160 is established. The storage unit 116 is usable to store data such as programs and large-volume data such as image data. To examine whether an image data obtained with the reader 102 includes any defective image such as a smear or faded portion, the product inspection processing unit 117 calculates a difference value based on correct images stored as correct images on the RAM 113 and a scanned image targeted for inspection. The product inspection processing unit 117 subsequently compares the calculated difference value with inspection thresholds (contrast and size) of inspection categories with respect to each pixel to perform inspection. The result obtained as a result of inspection is stored in the RAM 113. For example, information on whether a printout includes any defective image and positional information of a detected defective image to be used when the type (spot or streak) of the defective image is displayed with the UI unit 118 are stored. The inspection result is transmitted to the reader 102 through the communication cable 160.

The UI unit 118 is implemented by, for example, a keyboard, a mouse, a display, and another input/output device. The UI unit 118 is a device usable to input various set values or designated values.

The client PC 120 is a personal computer for establishing connection with the inspection apparatus 110, the product inspection RIP server 130, and the printer server 140 and controlling the inspection apparatus 110, the product inspection RIP server 130, and the printer server 140. The client PC 120 includes a machine control unit 121 and a UI unit 128. The machine control unit 121 is implemented with a controller board, on which a CPU 122, a RAM 123, a ROM 124, a communication I/F unit 125, and a storage unit 126 are mounted. The functions of the individual elements in the client PC 120 are the same as the elements in the inspection apparatus 110, and descriptions thereof are not repeated.

The product inspection RIP server 130 is a server for performing RIP processing on print data or document data to produce correct images for product inspection. The product inspection RIP server 130 includes a machine control unit 131 and a UI unit 138.

In the present disclosure, the product inspection RIP server 130 is also referred to as an image processing apparatus. The machine control unit 131 is implemented with a controller board, on which a CPU 132, a RAM 133, a ROM 134, a communication I/F unit 135, a storage unit 136, and an image processing unit 137 are mounted. The functions of the individual elements except the image processing unit 137 in the product inspection RIP server 130 are the same as the elements in the inspection apparatus 110, and descriptions thereof are not repeated.

The image processing unit 137 converts print data or document data transmitted from the client PC 120 into bitmapped image data by performing RIP processing for generating correct images for product inspection. Specifically, the RIP processing for generating correct images for product inspection is generating an image by changing resolution from 600 dpi to 300 dpi. A correct image is generated by the product inspection RIP server 130 as an image file representing one page. For example, when a job with one file having five pages is received as a job for generating correct images, correct images consisting of five image files produced by separating the individual pages is generated.

In the present embodiment, the product inspection RIP server 130 includes a plurality of CPUs 132, which enables simultaneous operations of performing RIP processing on individual pages with the respective CPUs.

The printer server 140 is a server for, as well as RIP processing for printing print data or document data, control on printing with the image forming apparatus 100 and management of print jobs. The printer server 140 includes a machine control unit 141 and a UI unit 148. The machine control unit 141 is implemented with a controller board, on which a CPU 142, a RAM 143, a ROM 144, a communication I/F unit 145, a storage unit 146, and an image processing unit 147 are mounted. The functions of the individual elements in the printer server 140 are the same as the elements except the image processing unit 137 in the product inspection RIP server 130, and descriptions thereof are not repeated.

The image processing unit 147 converts print data or document data transmitted from the client PC 120 into bitmapped image data by performing RIP processing for printing print data or document data in accordance with print settings. Specifically, the RIP processing for printing is generating an image without lowering the resolution of 600 dpi.

The above has described the overall system configuration including the inspection apparatus of the embodiment. The image forming apparatus 100, the inspection apparatus 110, the client PC 120, the product inspection RIP server 130, and the printer server 140 are able to communicate with each other through the network 150. The present embodiment should not be interpreted as limiting; communication may be implemented by, for example, establishing network connection among the machines.

Configuration Diagram of Image Forming Apparatus

Figure 2:
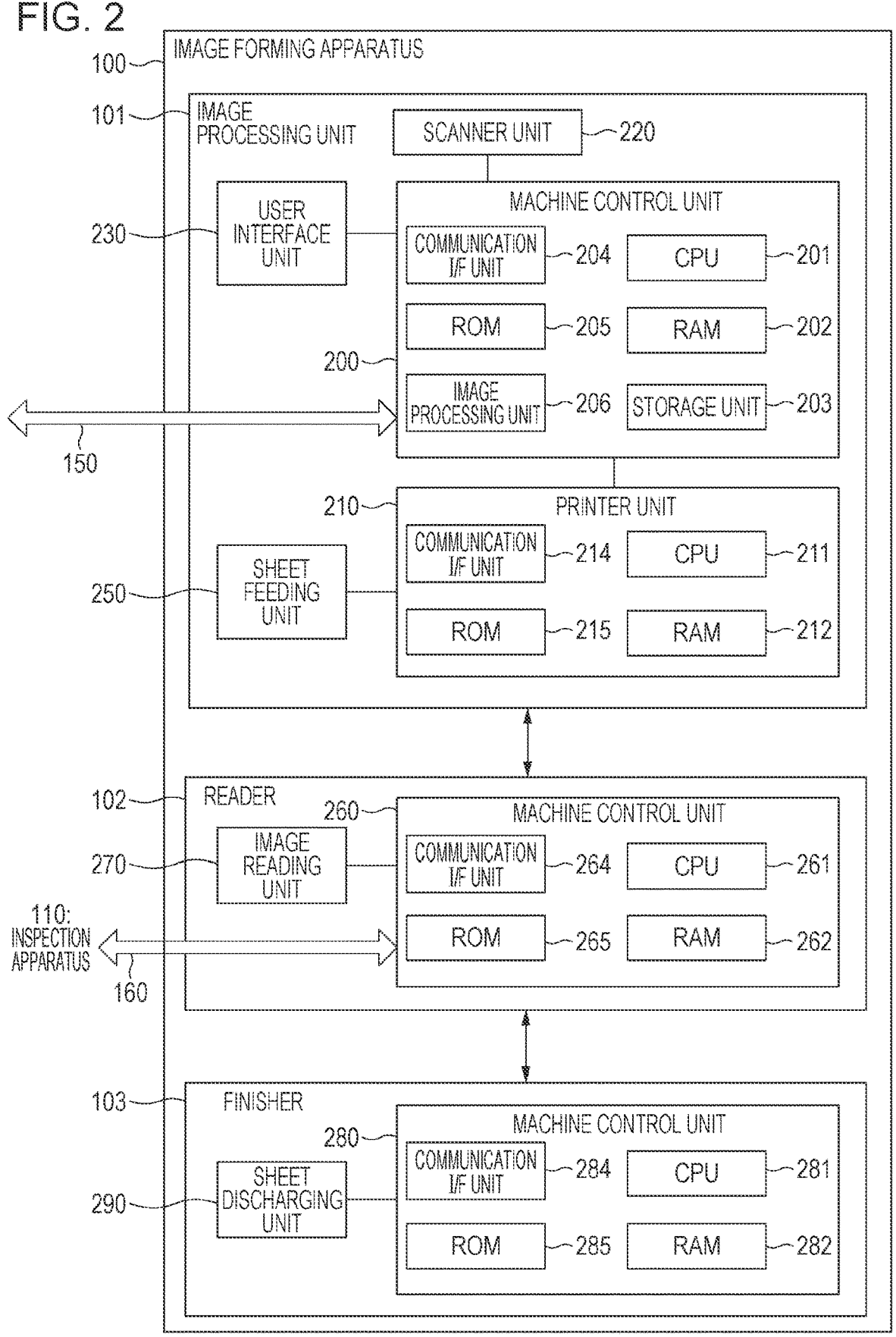
FIG. 2 illustrates an internal configuration of an image forming apparatus according to the first embodiment.

FIG. 2 illustrates an internal configuration of the image forming apparatus 100 of the present embodiment. The image forming apparatus 100 includes the image processing unit 101, the reader 102, and the finisher 103. The image processing unit 101 includes a machine control unit 200, a printer unit 210, a scanner unit 220, a user interface unit (a UI unit) 230, and a sheet feeding unit 250.

The machine control unit 200 receives an image or document through the network 150 and converts the image or document into print data. The machine control unit 200 includes a CPU 201, a RAM 202, a storage unit 203, a communication I/F unit 204, a ROM 205, and an image processing unit 206. The functions of the individual elements are the same as the elements in the printer server 140, and descriptions thereof are not repeated.

The image processing unit 206 obtains page description language (PDL) data stored in the RAM 202 and performs image processing for print image data conversion. The image processing for print image data conversion is, for example, conversion into binary bitmap data by performing RIP processing on PDL data to convert the PDL data into multi-value bitmap data and performing digital half toning such as screening. The binary bitmap data obtained by the image processing unit 206 is transmitted via the communication I/F unit 204 to the printer unit 210.

The printer unit 210 receives a recording sheet transported from the sheet feeding unit 250, receives the binary bitmap data generated by the machine control unit 200, and prints on the recording sheet using color materials. At this time, an instruction is provided for the printer unit 210 in accordance with print settings selected by a user.

For example, when coated paper is selected in print settings, a CPU 211 provides an instruction to print with a paper cassette (not illustrated) storing coated papers in the sheet feeding unit 250. The different kinds of processing from receiving PDL data as described above to printing on a sheet are performed under the control of the machine control unit 200 and the printer unit 210, and as a result, a full-color toner image is formed on a sheet.

The printer unit 210 includes the CPU 211, a RAM 212, a communication I/F unit 214, and a ROM 215. The functions of the individual elements are the same as the elements in the machine control unit 200, and descriptions thereof are not repeated.

The scanner unit 220 is a unit for obtaining image data of multiple values of red, green, and blue based on read signals obtained by sensing, using a sensor such as a charge-coupled device (CCD) sensor with a lens, a reflected image of an original image illuminated by a light source that is not illustrated in the drawings.

The UI unit 230 is implemented by, for example, a keyboard, a mouse, a display, and another input/output device. The UI unit 230 is a device usable to input various set values or designated values.

The sheet feeding unit 250 is a unit having one or more cassettes for setting sheets for printing, configured to feed a sheet from a cassette corresponding to a paper size selected in print settings and transport the sheet to the printer unit 210.

The reader 102 includes a machine control unit 260 and an image reading unit 270.

The image reading unit 270 reads a printout transported from the image processing unit 101. The image reading unit 270 is a unit for obtaining image data of multiple values of red, green, and blue based on read information obtained by sensing, using a contact image sensor (CIS) with a unity magnification image combining lens, a reflected image of an original document, which is a printout, illuminated by a light source that is not illustrated in the drawings. The image reading unit 270 of the present embodiment may obtain image data with a CCD sensor instead of a CIS sensor.

The machine control unit 260 provides control to transfer the image data obtained by the image reading unit 270 to the inspection apparatus 110 described later through the communication cable 160. The transferred image data is subjected to inspection by the inspection apparatus 110 with respect to whether the printout includes any defective image. The machine control unit 260 receives the inspection result from the inspection apparatus 110 and transmits the inspection result to the finisher 103. The machine control unit 260 includes a CPU 261, a RAM 262, a communication I/F unit 264, and a ROM 265.

The functions of the individual elements are the same as the elements in the machine control unit 200, and descriptions thereof are not repeated.

The finisher 103 includes a machine control unit 280 and a sheet discharging unit 290. The machine control unit 280 determines how to control sheet discharging with the sheet discharging unit 290 based on print settings and product inspection results. The machine control unit 280 includes a CPU 281, a RAM 282, a communication I/F unit 284, and a ROM 285. The functions of the individual elements are the same as the elements in the machine control unit 200, and descriptions thereof are not repeated. The sheet discharging unit 290 is a unit for performing post-processing (for example, bookbinding) according to print settings on the printout transported from the reader 102 and changing the output destination depending on the inspection result.

For example, when the output destination is changed depending on whether a printout includes a defective image, the finisher 103 refers to the inspection result received from the reader 102 and accordingly discharges a printout without any defective image and a printout with a defective image to different trays.

The above has described the image forming apparatus 100 according to the embodiment of the present disclosure. The present embodiment should not be interpreted as limiting; any configuration may be used when the configuration enables printing of print data and reading of an image for performing inspection with respect to whether a printout includes any defective image.

Flow of Correct Image Processing with Product Inspection System

Figure 3:
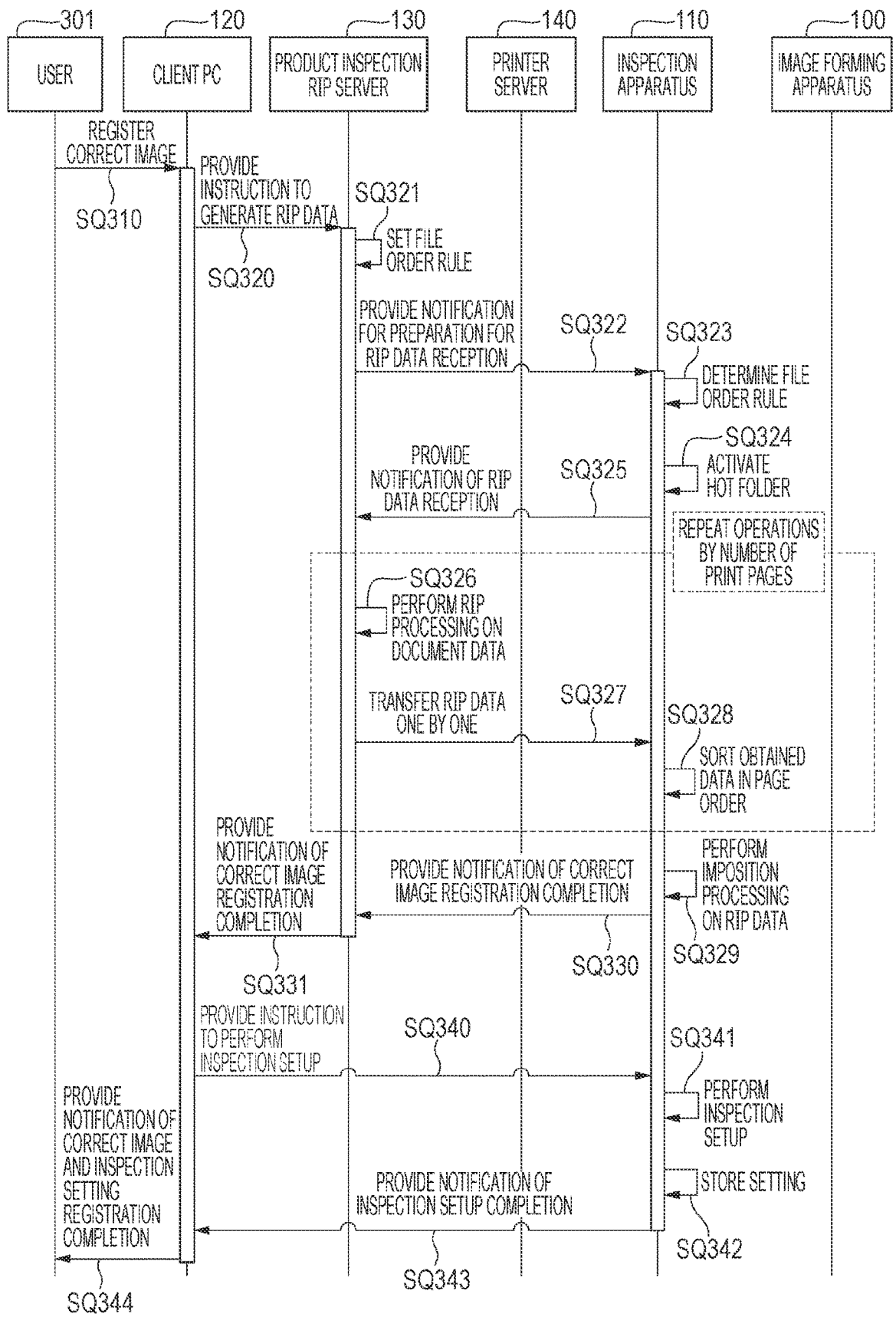
FIG. 3 is a sequence diagram of a process of registering correct images and inspection settings according to the first embodiment.

FIG. 3 illustrates a flow of a process in which a user 301 registers correct images and inspection settings on the product inspection system prior to inspection. In this flow, print data is subjected to RIP processing to generate image data, and the generated image data items are sorted in the order of prints to be inspected. By implementing this flow, the operation of registering correct images and inspection settings prior to printout inspection is made complete.

The operations in FIG. 3 are performed by the client PC 120, the product inspection RIP server 130, the inspection apparatus 110, and the image forming apparatus 100 that are operated by the user 301.

At this time, the operations of the inspection apparatus 110 are performed under the control of the machine control unit 111 with the CPU 112 in the state in which a program code stored in the storage unit 116 is loaded on the RAM 113. The operations of the client PC 120 are performed under the control of the machine control unit 121 with the CPU 122 in the state in which a program code stored in the storage unit 126 is loaded on the RAM 123. The operations of the product inspection RIP server 130 are performed under the control of the machine control unit 131 with the CPU 132 in the state in which a program code stored in the storage unit 136 is loaded on the RAM 133. The operations of the image forming apparatus 100 are performed under the control of the machine control unit 200 with the CPU 201 in the state in which a program code stored in the storage unit 203 is loaded on the RAM 202.

Firstly, in SQ310, the user 301 operates the client PC 120 to provide an instruction to register correct images.

Next, in SQ320, the client PC 120 instructs the product inspection RIP server 130 to perform an operation of generating RIP data from document data and transferring the data to the inspection apparatus 110 so as to register correct images. In the present embodiment, at this time, document data as original data used to generate RIP data is transmitted from the client PC 120 to the product inspection RIP server 130.

Next, in SQ321, the product inspection RIP server 130 sets a rule of order of files to be generated by RIP processing.

Figure 5:
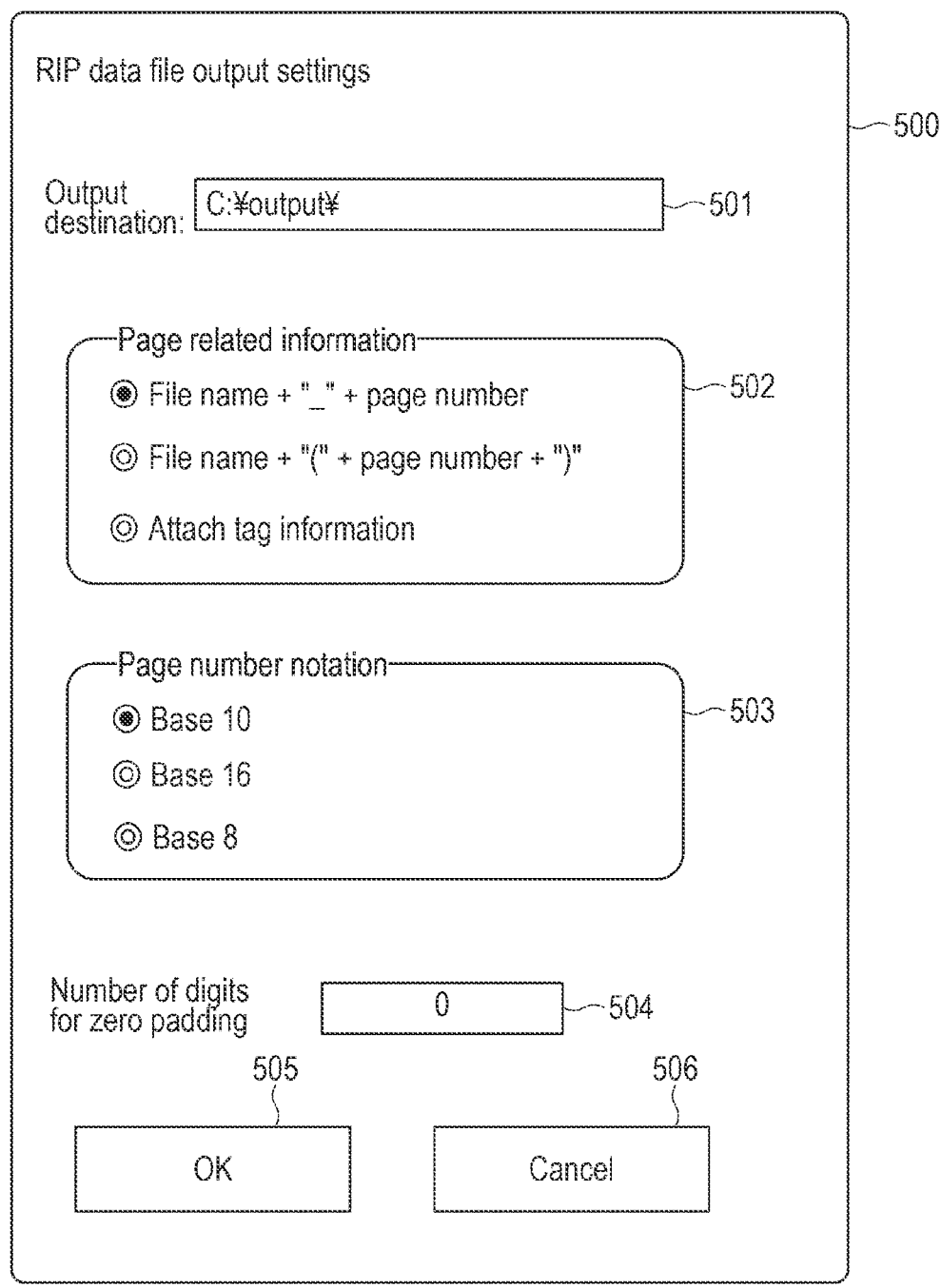
FIG. 5 is an example of a user interface (UI) screen for setting page related information according to the first embodiment.

FIG. 5 illustrates an example of a user interface (UI) for setting page related information of document data to be subjected to RIP processing.

A UI 500 in FIG. 5 is used to set a rule of order of files prior to an operation of registering correct images. The UI 500 is a UI screen displayed on the UI unit 138 of the product inspection RIP server 130.

The textbox 501 can be pressed by the user to set the path of a folder that is used as the output destination of generated RIP data. In the present embodiment, the textbox 501 is a UI for direct input with, for example, a keyboard, but the present embodiment should not be interpreted as limiting; a folder as the output destination may be selected on a displayed dialog. An external folder other than the product inspection RIP server such as the inspection apparatus 110 as in the present embodiment may be set as the output destination.

Next, a radio button 502 can be pressed by the user to set page related information to be added or changed when RIP data is generated. In the present embodiment, the page related information is selected with the radio button 502 among the following three options. The first option of the page related information is a rule in which "_" is added after the file name, followed by a page number. The second option of the page related information is a rule in which "(" is added after the file name, followed by a page number and ")". The second option of the page related information is a rule in which a file generation time is attached as tag information in the header, or the file generation time is changed. For example, in the page information setting, information of a generation time (an image creation time) as tag information is attached in the page order, and as a result, the page order can be identified. The present embodiment should not be interpreted as limiting; any method is applicable when page related information of a file used to generate RIP data is identified by the method.

Next, a radio button 503 can be pressed by the user to set a numeral system to express page related information attached using the radio button 502. The numeral system selectable in the present embodiment is base 10, base 16, or base 8. However, the present embodiment should not be interpreted as limiting; any method indicating an order such as alphabetical order is applicable. The UI may be configured such that, when the first or second option is selected with the radio button 502, the radio button 503 becomes active and configuring the setting is enabled.

Next, a textbox 504 can be used by the user for input to set a particular number of digits to be used to perform an operation for using the same number of digits (zero padding) when a page number is indicated with the file name. For example, when the number of digits is 3, and the page number is 12, "012" is used as the page number as indicated in the radio button 502. It may be possible that when 0 is set, zero padding is not performed.

A button 505 can be pressed by the user to save the set values inputted by the user after all the settings regarding output of RIP data files is completed. A button 506 can be pressed by the user to cancel the operation of configuring the settings regarding output of RIP data files. When the user presses the button 506, the information in the process of setting is deleted, and the process ends.

According to the page related information about RIP data set with the UI 500, RIP data is generated in SQ326 described later. The above has described the UI for setting page related information about document data to be subjected to RIP processing, according to the present embodiment.

Next, in SQ322, the product inspection RIP server 130 instructs the inspection apparatus 110 to prepare for reception of RIP data transferred from the client PC. At this time, the product inspection RIP server 130 instructs the inspection apparatus 110 to set the rule of order of files to be generated by RIP processing, configured in SQ321.

Next, in SQ323, the inspection apparatus 110 sets, as a sorting rule regarding the page order, the set values of page related information in the settings for outputting files generated by RIP processing, configured in SQ321. In the present embodiment, the contents configured with the radio buttons 502 and 503 and the textbox 504 are set. Next, in SQ324, the inspection apparatus 110 activates a hot folder to be monitored, identified by the setting of output destination of RIP files that is set in SQ321. In the present embodiment, the setting with the textbox 501 is the setting of output destination of RIP files. Monitoring is performed to check whether an event of file transfer to the hot folder targeted for inspection monitoring occurs; when transfer of RIP data is completed, the operation in SQ328 described later is performed.

Next, in SQ325, the inspection apparatus 110 notifies the product inspection RIP server 130 that the series of operations for receiving RIP data are completed. Next, in SQ326, based on the document data that is received from the client PC 120 in SQ320 and the page related information that is set in SQ321, the product inspection RIP server 130 performs RIP processing on each page to generate RIP data. In the present embodiment, the product inspection RIP server 130 includes a plurality of CPUs 132, which perform simultaneous operations of performing RIP processing on individual pages with the respective CPUs. As a result of performing RIP processing in a simultaneous manner, multiple image files are generated. The present embodiment should not be interpreted as limiting; distributed processing using multiple product inspection RIP servers may be applied. For example, when RIP processing is performed on three pages of document data (file name: TEST.PDF) with the page related information that is set to the setting for adding "_"+page number to the end of the file name, the product inspection RIP server generates the following three files: a file of the first page named TEST_1.tiff, a file of the second page named TEST_2.tiff, and a file of the third page named TEST_3.tiff. When the amount of processing for the first page is relatively large, and the amount of processing for the second page is relatively small, the files are generated in a different order. As a result, three items of RIP data are generated in the order, TEST_2.tiff, TEST_3.tiff, and TEST_1.tiff.

For example, three pages of document data (file name: TEST.PDF) may be changed to three items of document data each corresponding to one page to perform RIP processing. Specifically, a file of the first page named TEST_1.pdf, a file of the second page named TEST_2.pdf, and a file of the third page named TEST_3.pdf are generated, and these three files are simultaneously subjected to RIP processing.

Next, after the product inspection RIP server 130 completes generation of RIP data of one page in SQ326, in SQ327, the product inspection RIP server 130 promptly transfers the RIP data of one page to the hot folder targeted for monitoring in the inspection apparatus 110. For example, the product inspection RIP server 130 transfers three items of RIP data in the order, TEST_2.tiff, TEST_3.tiff, and TEST_1.tiff, to the hot folder targeted for monitoring in the inspection apparatus 110.

Next, in SQ328, the inspection apparatus 110 reads the RIP data items transferred in SQ327, calculates page numbers based on the applied page related information that is set in SQ321, and sorts the RIP data items in the page order. For example, when three items of RIP data are received in the order, TEST_2.tiff, TEST_3.tiff, and TEST_1.tiff, the operation in SQ328 is performed as follows. Firstly, according to the file name TEST_2.tiff, the file received first is identified as the RIP data generated as the second page. Similarly, according to the file name TEST_3.tiff, the file received second is identified as the file of the third page; according to the file name TEST_1.tiff, the file received third is identified as the file of the first page. As a result of sorting in the page order, RIP data items are arranged in the page order, TEST_1.tiff, TEST_2.tiff, and TEST_3.tiff. In the present embodiment, the page related information is set to the setting for adding "_"+page number to the end of the file name in the description, but the page related information may be set to other rules selected with the radio button 502. When a rule selectable with the radio button 502, such as the rule for adding parentheses or the rule for adding tag information, is set, page numbers are identified according to the setting. Regarding the radio button 503 that indicates the notation of page number, page numbers are similarly identified according to the setting.

The operations from SQ326 to SQ328 are repeated by the number of print pages of document data, and all the RIP data items are sorted in the page order. After each RIP data item is generated in SQ327, the RIP data item is promptly transferred. However, the pages may be transmitted after RIP processing is performed on all the pages. In this case, the sorting operation according to the page order in SQ328 may be performed by the product inspection RIP server 130, and the sorted data may be transmitted to the inspection apparatus 110.

In the present embodiment, when multiple RIP data items of the same page number are repeatedly transferred, the RIP data item received at the latest time point is used in the subsequent operations. However, any other of the RIP data items may be used. When the RIP data item received at the latest time point is different from the RIP data item received at the earliest time point with respect to the length and width of image data or file name, the operation in SQ328 is not performed. When the length and width of image data or the file name differs between RIP data items, there is a possibility that different kinds of document data have been subjected to RIP processing in a mixed manner. Avoiding processing on different kinds of RIP data prevents inspection of different kinds of document data in a mixed manner.

In the description of the present embodiment, the operations from SQ326 to SQ328 are repeated by the number of pages, but this should not be interpreted as limiting. For example, the configuration may be such that the operation in SQ326 is repeated by the number of print pages, RIP data items of all the pages are transmitted in SQ327, and the data items of all the pages are sorted in the page order in SQ328.

Next, in SQ329, the inspection apparatus 110 performs imposition processing on the RIP data items having been sorted through the operations to SQ328 to generate correct images. The imposition processing in the present embodiment is, when the size of the received image is not the same as the paper size for printing, adjusting the size of the received image to the paper size without changing magnification by cutting out an area by cropping or adding white pixels. Next, in SQ330, the inspection apparatus 110 notifies the product inspection RIP server 130 that the process has proceeded to SQ329, and the correct images generated by imposing the sorted RIP data items have been registered. Next, in SQ331, in response to receiving the notification provided in SQ330, the product inspection RIP server 130 notifies the client PC 120 that correct images have been generated and registered. Next, in SQ340, the client PC 120 instructs the inspection apparatus 110 to perform inspection setup for product inspection. Next, in SQ341, the inspection apparatus 110 sets various inspection parameters of inspection area, inspection level, and other specifics in accordance with user's inspection settings. The UI for performing inspection setup in SQ341 in the present embodiment will be described in detail later. Next, in SQ342, the inspection apparatus 110 ends the inspection setup performed in SQ341 and stores the various inspection parameters of inspection area, inspection level, and other specifics, so that the inspection apparatus 110 is prepared for inspection.

Next, in SQ343, the inspection apparatus 110 notifies the client PC 120 that inspection setup has been completed. Next, in SQ344, the client PC 120 notifies the user that the series of operations for registering correct images and inspection settings have been completed.

The above has described details about the flow of the process for registering correct images and inspection settings before inspection in the present embodiment.

Figure 6:
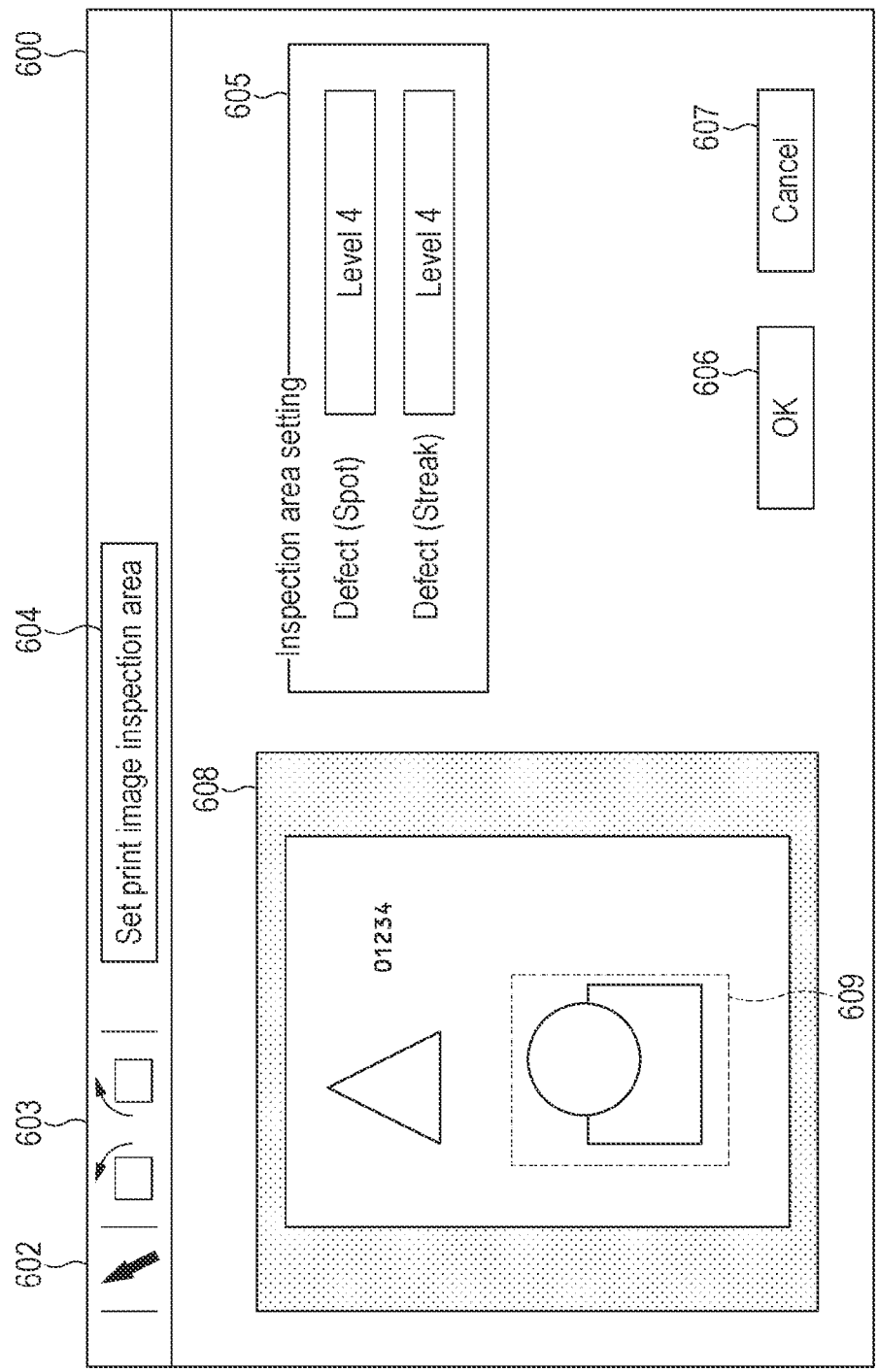
FIG. 6 is an example of a UI screen for inspection settings according to the first embodiment.

Next, an example of the UI relating to inspection setup in SQ341 will be described with reference to FIG. 6. A UI 600 in FIG. 6 is a UI screen displayed on the UI unit 118 of the inspection apparatus 110 when inspection setup is performed in SQ344. A button 602 is a button for selecting an inspection area. The button 602 can be pressed by the user to change the setting information about area that is previously set. Buttons 603 are buttons for rotating the image displayed in a page preview 608. The page preview 608 is a display screen for displaying the correct images subjected to imposition in SQ329. A button 604 can be pressed by the user to set an area for print image inspection. The method for setting an area for print image inspection in the present embodiment applies the following procedure. Firstly, the button 604 of print image inspection area setting is pressed by a user operation. Next, an area to be subjected to print image inspection is defined by a user operation on the page preview 608, and the inspection apparatus 110 accordingly designates the defined area as a print image inspection area 609. The print image inspection area is an inspection area to be subjected to inspection to detect a defective image in a printout.

A UI 605 provides a collection of UIs for setting levels of defective images to be detected when print image inspection is performed; with the UI 605, detection categories and the levels of the detection categories are set for defective image detection in print image inspection. The detection category for print image inspection is a category of a feature of defective image to be detected when a printout is inspected; the detection category is, for example, circular defective image (spot) or linear defective image (streak). The detection level is a parameter selectable from different degrees with respect to each feature of detected defective image, configured to determine a particular magnitude above which an image is identified as a defective image. The detection level includes, for example, five levels from Level 1 to Level 5. As the detection level increases from the Level 1 to Level 5, the detectable intensity and size of defective image decreases. Different levels can be set for the individual detection categories: for example, Level 5 for spot, and Level 4 for streak. The UI 605 indicates that the user selects Level 4 for the detection level of defective image (spot) and Level 4 for the detection level of defective image (streak).

A button 606 is usable to save the inspection settings configured in SQ342 after all the inspection settings are set. A button 607 is usable to cancel inspection setup. When the user presses the button 607, the information in the process of setting is deleted, and inspection setup ends. The above has described the UI relating to inspection setup in SQ341 in the present embodiment. After the inspection setup in FIG. 6 is finished, when the user calls the inspection setup, it is possible to change the inspection settings again.

Flow of Inspection with Product Inspection System

Figure 4:
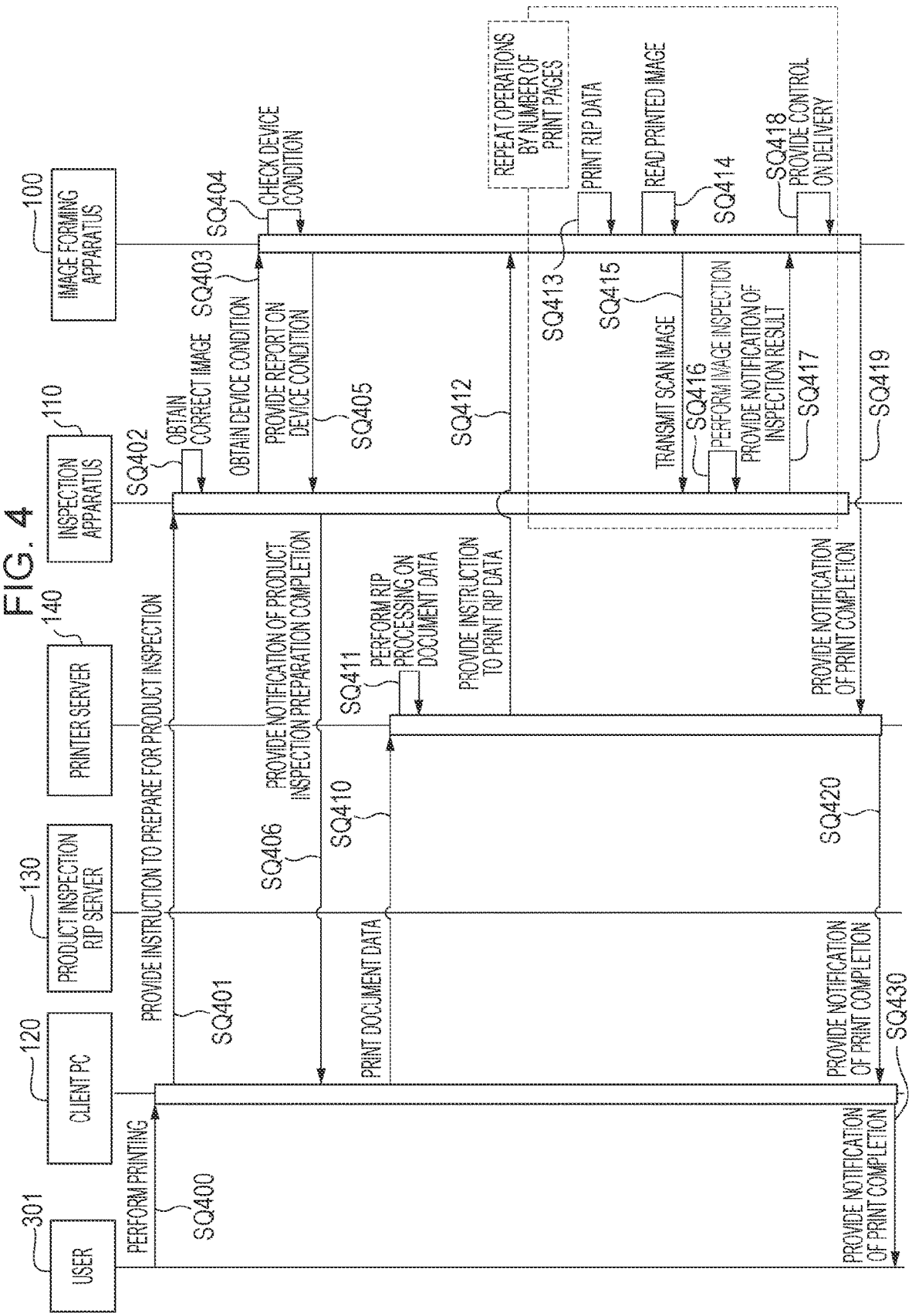
FIG. 4 is a sequence diagram of a product inspection process according to the first embodiment.

FIG. 4 illustrates a flow of a process in which the user 301 causes the image forming apparatus 100 to print with the printer server 140, and the inspection apparatus 110 performs inspection on the printout with respect to whether the printout includes any defective image in accordance with the inspection settings configured in FIG. 3. The operations in FIG. 4 are performed by the client PC 120, the printer server 140, the inspection apparatus 110, and the image forming apparatus 100 that are operated by the user 301. At this time, the operations of the inspection apparatus 110 are performed under the control of the machine control unit 111 with the CPU 112 in the state in which a program code stored in the storage unit 116 is loaded on the RAM 113. The operations of the client PC 120 are performed under the control of the machine control unit 121 with the CPU 122 in the state in which a program code stored in the storage unit 126 is loaded on the RAM 123. The operations of the printer server 140 are performed under the control of the machine control unit 141 with the CPU 142 in the state in which a program code stored in the storage unit 146 is loaded on the RAM 143. The operations of the image forming apparatus 100 are performed under the control of the machine control unit 200 with the CPU 201 in the state in which a program code stored in the storage unit 203 is loaded on the RAM 202.

Firstly, in SQ400, the user 301 inputs an instruction to perform printing and product inspection on the client PC 120. Next, in SQ401, the client PC 120 instructs the inspection apparatus 110 to prepare for product inspection. The inspection settings configured in SQ341 are used in product inspection. Next, in SQ402, the client PC 120 obtains the correct images subjected to imposition in SQ329 and the inspection settings configured in SQ341.

Next, in SQ403, the client PC 120 instructs the image forming apparatus 100 to report whether the individual units are operable for printing and product inspection. Next, in SQ404, the image forming apparatus 100 obtains condition information about whether the image processing unit 101, the reader 102, and the finisher 103 are usable and accordingly determines whether it is possible to perform printing and product inspection.

Next, in SQ405, the image forming apparatus 100 reports to the inspection apparatus 110 whether it is possible to perform printing and product inspection, which is determined in SQ404. Next, in SQ406, based on the report that it is possible to perform printing and product inspection, provided in SQ405, the inspection apparatus 110 notifies the client PC 120 that preparation for product inspection is completed.

Next, in SQ410, the client PC 120 instructs the printer server 140 to perform printing using the document data and the print settings selected by the user.

Next, in SQ411, the printer server 140 performs RIP processing using the document data and print settings selected by the user that are assigned in SQ410. In the present embodiment, RIP processing for document data is performed prior to the operations in SQ412 and the subsequent steps.

Next, in SQ412, the printer server 140 instructs the image forming apparatus 100 to print using the RIP data generated in SQ411 and the print settings selected by the user. Next, in SQ413, the printer unit 210 of the image forming apparatus 100 prints pages one by one based on the RIP data and print settings selected by the user that are received in SQ412. Next, in SQ414, the machine control unit 260 of the image forming apparatus 100 obtains, using the image reading unit 270, scan image data generated by reading the printout printed in SQ413. Next, in SQ415, the image forming apparatus 100 transmits the scan image data read in SQ414 to the inspection apparatus 110 through the communication cable 160. Next, in SQ416, based on the scan image data received in SQ415 and the correct images subjected to imposition and inspection settings that are read in SQ402, the inspection apparatus 110 performs inspection with respect to whether the scan image data contains any defective image. At this time, the inspection apparatus 110 stores, as well as information about whether the printout includes any defective image, the type of detected defective image (spot or streak) and a scanned image of an area around the portion detected as a defective image or the entire page.

Next, in SQ417, the inspection apparatus 110 notifies the image forming apparatus 100 of the inspection result obtained in SQ416 through the communication cable 160. Next, in SQ418, the image forming apparatus 100 changes the output destination in the finisher 103 based on the inspection result received in SQ417. For example, a printout without any defective image detected is outputted to a particular tray of the finisher selected by the user, whereas a printout with a defective image detected is outputted to a tray for defective images. The present embodiment should not be interpreted as limiting; when a defective image is detected, reprinting may be automatically performed to recover from the condition of having the defective image. As a result of performing reprinting every time any defective image is detected, a set of printouts without any defective image are obtained on the tray of the finisher.

When all the pages of document data have not been printed, the operations of printing and product inspection from SQ413 to SQ418 are cyclically repeated until all the pages are printed. Next, in SQ419, the image forming apparatus 100 notifies the printer server 140 that printing and product inspection have been performed on all the pages of document data. Next, in SQ420, the printer server 140 notifies the client PC 120 that printing and product inspection have been performed on all the pages of document data. Next, in SQ430, the client PC 120 notifies the user 301 that printing and product inspection have been performed on all the pages of document data.

The above has described details about the flow of the process in FIG. 4 in which the user 301 causes the image forming apparatus 100 to print with the printer server 140, and the inspection apparatus 110 performs inspection on the printout with respect to whether the printout includes any defective image in accordance with the inspection settings configured in FIG. 3. As described above, the present embodiment enables matching with the image that is read with the product inspection sensor, by soring correct image data items in accordance with the page related information attached to the correct image data items and imposing the sorted correct image data items.

In the method described in the above embodiment, correct image data items are sorted in accordance with the page related information attached to the correct image data items instead of chronological order, and the sorted correct image data items are imposed to perform product inspection. The following describes, as a second embodiment, a method for generating correct images by, as well as performing sorting on correct image data in accordance with the page related information, performing imposition processing according to print settings selected by the user.

The imposition processing according to print settings selected by the user in the present embodiment is to change the order of RIP images from the page order to the print order and/or rotate RIP images so as to match the RIP images with printed pages, when the printed pages are changed with respect to page order and/or rotated with respect to orientation in accordance with print settings selectable by the user, such as print side, output side, print order, output destination, paper size, and binding direction in two-sided printing. By performing this imposition processing, when the print settings have been selected by the user, it is possible to match the correct images generated from RIP images with an image that is read with the product inspection sensor.

Print side is a setting regarding the side for printing, used for printing on one side or both sides.

In two-sided printing, printing is performed on the front and back sides of a sheet, and thus, one sheet corresponds to two pages of RIP images. In one-sided printing, printing is performed on either the front or back side of a sheet, and thus, one sheet corresponds to one page of an RIP image. Output side is a setting for assigning the front or back side of a printout to the print side of the printout when the printout is outputted. With Face up option (hereinafter referred to as FU), when the sheet is discharged, the print side is the front side. With Face down option (hereinafter referred to as FD), when the sheet is discharged, the print side is the back side.

Print order is a setting for selecting the order of pages to be printed between normal order, in which the first page is printed first, and reverse order, in which the last page is printed first. Output destination is a setting for specifying the output destination in the finisher 103. In the present embodiment, the output destination includes a tray unit and a stacking unit. While a sheet is being transported after the image reading unit 270 until the sheet is discharged, the sheet can be turned so that the sheet transport direction is changed. As a result of changing the sheet transport direction, given that one side of a sheet faces in a particular direction in the image reading unit 270, the side faces in a different direction when the sheet is discharged. Thus, it is necessary to perform imposition in a manner that alters with changes in the direction of the side that has been read by the image reading unit 270, depending on the output destination. How many times the sheet transport direction changes from the image reading unit 270 until the sheet is discharged differs depending on the output destination; for example, once to the tray unit, and twice to the stacking unit.

Paper size, which indicates the size of a sheet for printing, is a setting for assigning printing paper held in a cassette (not illustrated) in the sheet feeding unit 250. In the present embodiment, standard sizes of A4, A3, B4, and B5 are used for printing, but nonstandard-size paper of sizes specified by the user may be supported.

Binding direction in two-sided printing is a setting for, when two-sided printing is set, receiving a selection of a flip direction with respect to paper size by the user. The binding direction in the present embodiment includes long-edge binding and short-edge binding. With the option of long-edge binding, the longer side of paper size is used for binding. With the option of short-edge binding, the shorter side of paper size is used for binding. Depending on the settings of paper size and binding direction, it can be necessary to rotate RIP images by 90 or 270 degrees. Thus, the settings of paper size and binding direction are needed for rotation of RIP images in imposition. Depending on these print settings, the arrangement side and/or rotation can be changed in the imposition processing. The pattern for the imposition processing in the present embodiment is determined in accordance with, for example, an imposition correspondence table described later.

Flow of Correct Image Processing with Product Inspection System

Figure 7:
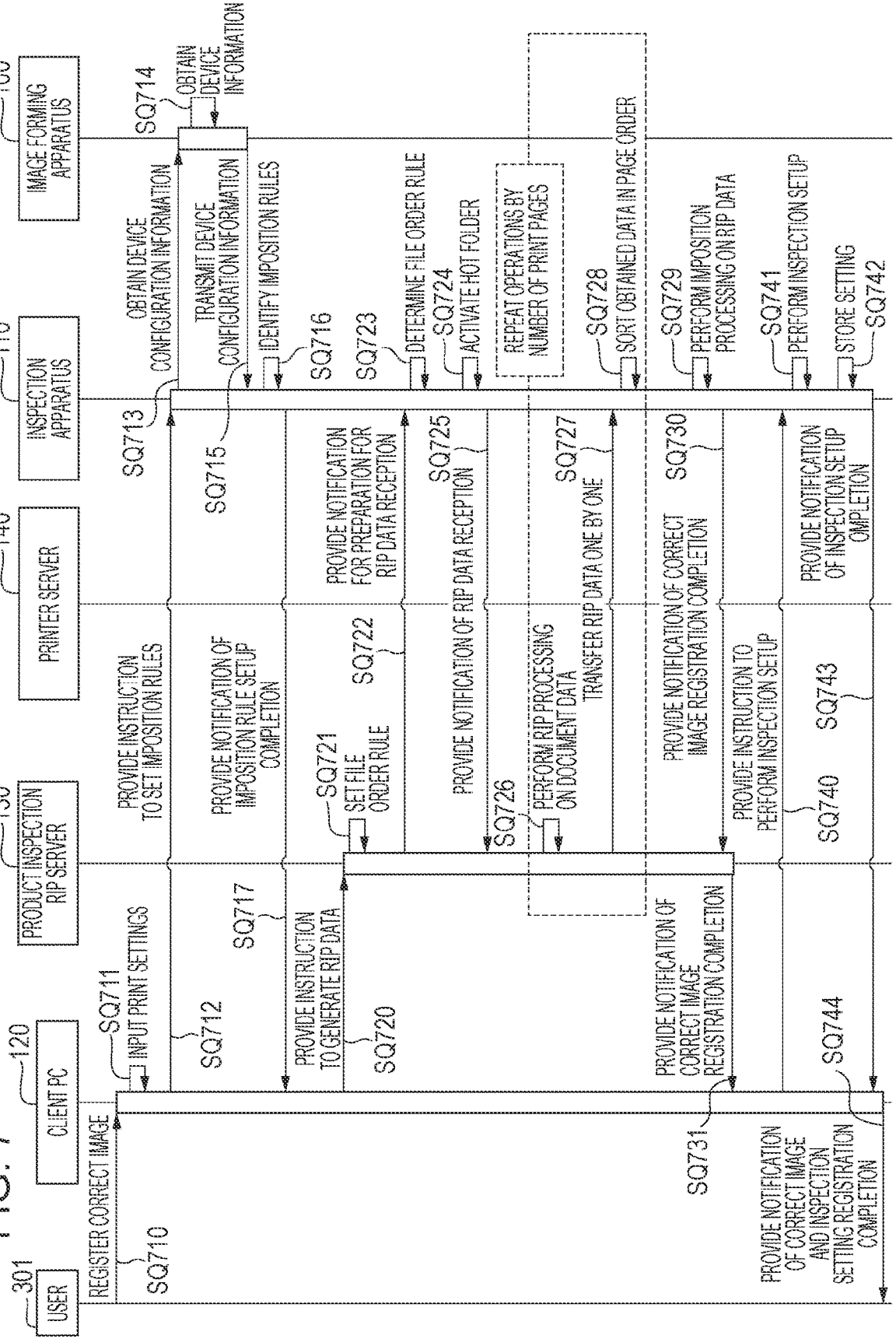
FIG. 7 is a sequence diagram of a process of registering correct images and inspection settings according to a second embodiment.

The following describes the points of the present embodiment that are different from the first embodiment. FIG. 7 illustrates a flow of a process in which the user 301 registers correct images and inspection settings on the product inspection system prior to inspection. By implementing this flow, print data is subjected to RIP processing to generate image data items; the generated image data items are sorted in the print order for inspection; the imposition processing is performed in accordance with the print settings selected by the user to generate correct images; accordingly, the registration operation prior to inspection is completed.

Firstly, SQ710 is the same as SQ310 in the first embodiment, and the description thereof is not repeated. Next, in SQ711, the user inputs print settings relating to the imposition processing, required for correct image generation, on the client PC 120.

FIG. 9 illustrates an example of a UI for configuring the settings regarding the imposition processing. A UI 900 in FIG. 9 is usable to input the print settings relating to the imposition processing, required for correct image generation; the UI 900 is a UI screen displayed on the UI unit 128 of the client PC 120. A radio button 901 can be selected by the user to set a paper size to be used in printing and product inspection. The paper selectable in the present embodiment includes standard-size paper in the range of paper sizes that the image forming apparatus 100 is able to print and nonstandard-size paper that is specified by the user. When nonstandard-size paper is selected, the length and width are additionally to be specified by input.

A radio button 902 can be pressed by the user to select a particular output destination in the finisher 103. The output destination in the present embodiment includes the tray unit and the stacking unit. However, when configuration information of the finisher 103 is obtained, the options may be increased or decreased depending on the configuration information. A radio button 903 can be pressed by the user to select the direction of output side between FU and FD. A radio button 904 can be pressed by the user to select print order between normal order and reverse order. A radio button 905 can be pressed by the user to select print side between both sides and one side. A radio button 906 can be pressed by the user to select binding direction in two-sided printing between long-edge binding and short-edge binding. A textbox 907 can receive an input by the user to set the total number of pages of RIP data to be subjected to imposition. Based on the number specified in the textbox 907 as the number of print pages, the operations from SQ726 to SQ728 described later are repeated.

A button 908 can be pressed by the user to save the set values inputted by the user after all the settings regarding the imposition processing is completed. A button 909 can be pressed by the user to cancel the operation of configuring the settings regarding the imposition processing. When the user presses the button 909, the information in the process of setting is deleted, and the flow of registering correct images ends. The above has described the UI for configuring the settings regarding the imposition processing in the present embodiment.

Next, in SQ712, the client PC 120 instructs the inspection apparatus 110 to set imposition rules for generating correct images from RIP images. At this time, the set values of the print settings regarding imposition that are set in SQ711 are transmitted.

Next, in SQ713, the inspection apparatus 110 provides an instruction for the image forming apparatus 100 to obtain device configuration information of the image forming apparatus 100. Next, in SQ714, the image forming apparatus 100 obtains device information. Specifically, to obtain device configuration information, the image forming apparatus 100 obtains information about the image processing unit 101, the reader 102, and the finisher 103. As the device information in the present embodiment, for example, information about paper held in cassettes (not illustrated) in the sheet feeding unit 250 and information about the output destinations in the sheet discharging unit 290.

Next, in SQ715, the image forming apparatus 100 transmits the device configuration information obtained in SQ714 to the inspection apparatus 110. Next, in SQ716, the inspection apparatus 110 identifies imposition rules for generating correct images from RIP data using the print settings regarding imposition configured in SQ711 and the device configuration information obtained in SQ714.

Figure 8:
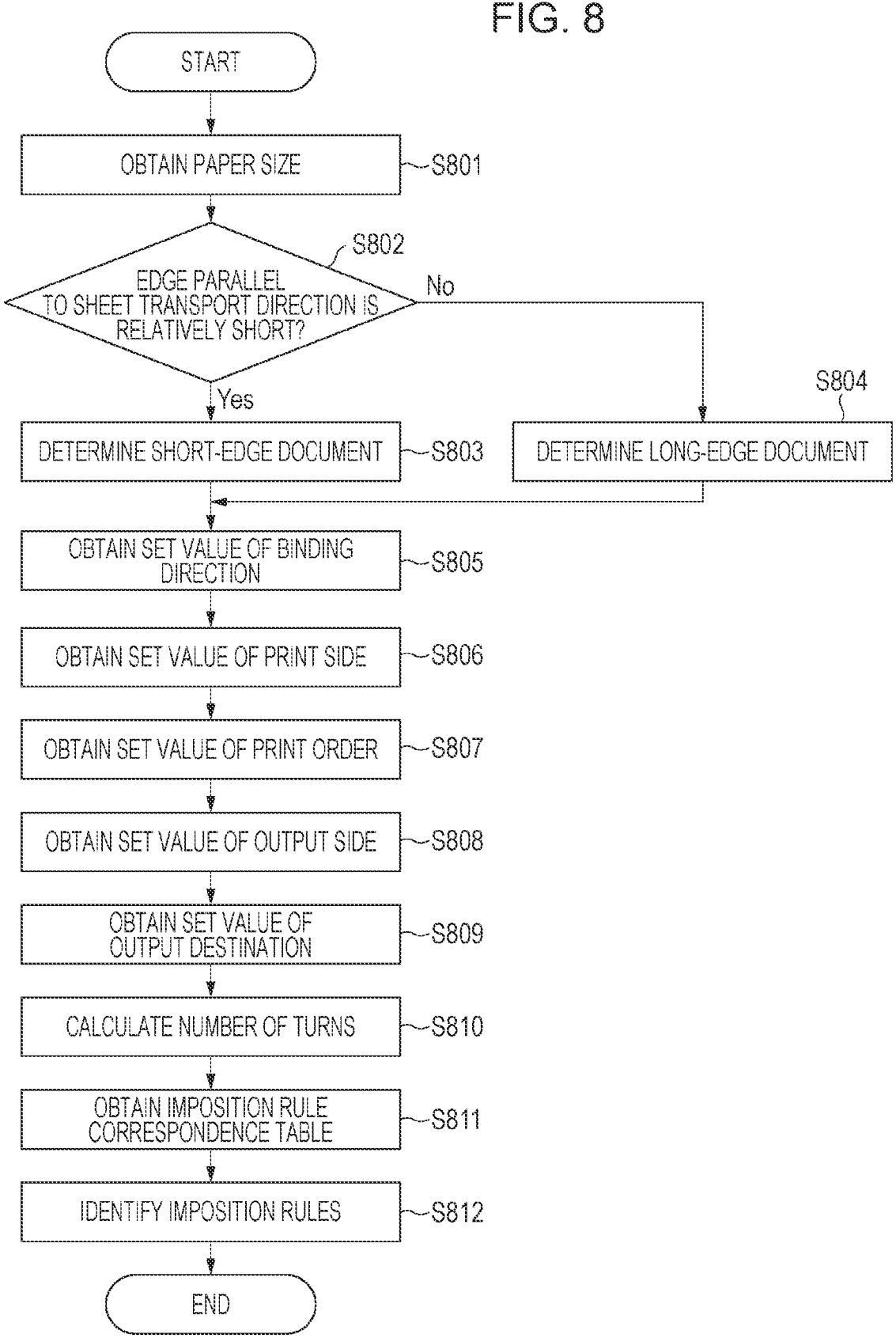
FIG. 8 is a flowchart of identifying imposition rules according to the second embodiment.

The following specifically describes a process for identifying imposition rules in the present embodiment with reference to FIG. 8. By implementing this process, a particular imposition rule for generating correct images from RIP images is identified, so that it is possible to perform rotation and rearranging on RIP data to generated correct images. The operations of inspection apparatus 110 are performed under the control of the machine control unit 111 with the CPU 112 in the state in which a program code stored in the storage unit 116 is loaded on the RAM 113.

Firstly, in step S801, the inspection apparatus 110 obtains a set value of paper size from the print settings regarding imposition configured in SQ711. Next, in step S802, the inspection apparatus 110 determines which edge is relatively long in the paper size obtained in step S801, with respect to the sheet transport direction. When in step S802 it is determined that the sheet transport direction is relatively short, in step S803, the inspection apparatus 110 determines that the original document is a short-edge document. When in step S802 it is determined that the sheet transport direction is relatively long, in step S804, the inspection apparatus 110 determines that the original document is a long-edge document.

Next, in step S805, the inspection apparatus 110 obtains a set value of binding direction from the print settings regarding imposition configured in SQ711. Next, in step S806, the inspection apparatus 110 obtains a set value of print side from the print settings regarding imposition configured in SQ711. Next, in step S807, the inspection apparatus 110 obtains a set value of print order from the print settings regarding imposition configured in SQ711. Next, in step S808, the inspection apparatus 110 obtains a set value of output side from the print settings regarding imposition configured in SQ711.

Next, in step S809, the inspection apparatus 110 obtains a set value of output destination from the print settings regarding imposition configured in SQ711. Next, in step S810, the inspection apparatus 110 calculates, based on the set value of output destination obtained in step S809, the number of times the sheet transport direction changes from the image reading unit 270 until the sheet is discharged (a direction change count). For example, in the present embodiment, when the tray unit is set, the direction change count is one; when the stacking unit is set, the direction change count (the number of turns) is two. When the information of output destination in the sheet discharging unit 290 is obtained in SQ714, information of direction change count is also obtained. Next, in step S811, the inspection apparatus 110 obtains an imposition rule correspondence table used to identify a rule for RIP data rotation and rearranging in the imposition processing according to print settings as input values.

FIG. 10 is an example of an imposition rule correspondence table in the present embodiment. The inspection apparatus 110 previously stores a multi-dimensional lookup table (LUT) indicating relationships between print settings as input values and imposition rules as illustrated in FIG. 10. The print settings as input values are print side, paper size relative to transport direction, binding direction, output side, print order, and direction change count, which are specified in the operations from step S801 to step S810.

The imposition rules as output values are print side, preferred side, imposition order, front side rotation, and back side rotation. Print side indicates a set value selected between one side and both sides for printing. Preferred side indicates a set value selected between front side and back side as the side first subjected to imposition. Imposition order is a set value selected between ascending order and descending order as the order in which imposition is performed. In ascending order, the first page of document data is printed first. In descending order, the last page of document data is printed first. Front side rotation indicates a set value of angle by which an RIP image to be arranged on the front side in imposition is rotated. Back side rotation indicates a set value of angle by which an RIP image to be arranged on the back side in imposition is rotated. As described above, the use of the imposition rule correspondence table enables identification of an imposition method based on the print settings. The present embodiment should not be interpreted as limiting; the categories of input and output values in the imposition rule correspondence table may be increased or decreased. In accordance with the device configuration of the image forming apparatus 100, the inspection apparatus 110 may select a corresponding imposition rule correspondence table. In another method, the image forming apparatus 100 may previously store the imposition rule correspondence table and transmit the imposition rule correspondence table together with the notification in SQ715.

Next, in step S812, the inspection apparatus 110 identifies imposition rules for generating correct images based on the print settings selected by the user with reference to the imposition rule correspondence table obtained in step S811. The above has described the process of identifying imposition rules in the present embodiment. The present embodiment should not be interpreted as limiting; when imposition rules for generating correct images are identified based on the print settings selected by the user, any configuration other than this configuration may be used.

For example, the LUT including print settings as input values and imposition rules as output values is used, but a method of identifying set values of imposition rules by performing branching based on input set values may be used.

Next, in SQ717, the inspection apparatus 110 notifies the client PC 120 that setup of imposition rules for generating correct images from RIP images is completed. The operations from SQ720 to SQ728 are the same as the operations from SQ320 to SQ328 in the first embodiment, and descriptions thereof are not repeated.

Next, in SQ729, the inspection apparatus 110 performs the imposition processing using the imposition rules identified in SQ716 on the RIP data items having been sorted through the operations to SQ728 to generate correct images. The imposition processing in the present embodiment is, when the size of the received image is not the same as the paper size for printing, adjusting the size of the received image to the paper size without changing magnification by cutting out an area by cropping or adding white pixels. The imposition processing also includes determining how to perform rotation on the front and back sides and the imposition order based on the imposition rules identified in SQ716. The operations from SQ730 to SQ744 are the same as the operations from SQ330 to SQ344 in the first embodiment, and descriptions thereof are not repeated.

As described above, according to the present embodiment, the inspection apparatus 110 receives RIP data generated by the product inspection RIP server 130 and performs rearranging on correct image data based on the page related information attached to the correct image data instead of chronological order. The rearranged correct image data is subjected to imposition in accordance with the print settings. As a result, the correct image data matches the images that are read by the product inspection sensor.

Inspection is performed by comparing the correct images generated by RIP processing with the product inspection RIP server 130 with the printout printed by the image forming apparatus 100 by RIP processing with the printer server 140. As a result, it is possible to detect defective images other than streaks and smears. For example, when an undesired drawing defect is caused by RIP processing with the printer server 140, the printout is outputted as a printout including a defective image. As such, product inspection covering drawing defects is implemented.

First Modification

The information about the device configuration of the image forming apparatus 100 may be previously obtained by the printer server 140, and the information about the device configuration may be later obtained via the printer server 140. The first modification is implemented in the following manner.

In SQ713, the inspection apparatus 110 provides an instruction for the printer server 140 to obtain device configuration information of the image forming apparatus 100. Next, in SQ714, the printer server 140 reads the device configuration information of the image forming apparatus 100 previously obtained.

Next, in SQ715, the printer server 140 transmits the device configuration information obtained in SQ714 to the inspection apparatus 110.

With the configuration described above, the information about the device configuration is obtained using the printer server 140 without accessing the image forming apparatus 100.

Second Modification

The information about the device configuration of the image forming apparatus 100 does not change every time product inspection is performed.

Thus, the inspection apparatus 110 may previously obtain the information about the device configuration and read the information in SQ713. For example, from various combinations of device configuration, the same device configuration information or the information of a device configuration that is able to achieve the same effect is selected and stored. As a result, without obtaining the device configuration information, correct images can be generated.

Third Modification

The inspection apparatus 110 identifies imposition rules by performing the operations from SQ713 to SQ716, but the operations are not necessarily performed by the inspection apparatus 110.

For example, the product inspection RIP server 130 may perform these operations. In this case, the operations from SQ713 to SQ716 are performed in the following manner.

Firstly, in SQ713, the product inspection RIP server 130 provides an instruction for the printer server 140 to obtain device configuration information of the image forming apparatus 100. Next, in SQ714, to obtain device configuration information, the image forming apparatus 100 obtains information about the image processing unit 101, the reader 102, and the finisher 103.

Next, in SQ715, the image forming apparatus 100 transmits the device configuration information obtained in SQ714 to the product inspection RIP server 130. Next, in SQ716, the product inspection RIP server 130 identifies imposition rules for generating correct images from RIP data using the print settings regarding imposition configured in SQ711 and the device configuration information obtained in SQ714.

With the configuration described above, imposition rules are identified using the product inspection RIP server 130 without accessing the inspection apparatus 110. This modification should not be interpreted as limiting; imposition rules may be identified using the client PC 120 or the printer server 140.

According to various embodiments of the present disclosure, when the order of generated correct images is not the same as the order of print images, sorting is performed on correct image data based on the page related information attached to the correct image data. As a result, the correct image data matches images read by the product inspection sensor.

Other Embodiments

Various embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)?), a flash memory device, a memory card, and the like.

While exemplary embodiments have been described, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2022-105512, filed Jun. 30, 2022, which is hereby incorporated by reference herein in its entirety.

What is claimed is:

1. An inspection apparatus configured to communicate with an image processing apparatus configured to generate image data based on document data, the inspection apparatus comprising:
   a controller having one or more processors and one or more memories, the controller configured to:
      receive a plurality of pieces of image data in an order of being generated by the image processing apparatus, each piece of the image data representing one page, and each piece of the image data being provided with a page number,
      receive page order information of the image data,
      rearrange the pieces of the image data based on the received page order information and the respective page number provided to each piece of the image data, and
      register the rearranged pieces of the image data as a reference image for inspection.

2. The inspection apparatus according to claim 1, wherein the plurality of pieces of the image data received by the inspection apparatus are generated by the image processing apparatus from the document data including a plurality of images, and
the respective page numbers provided to the image data are added to the image data by the image processing apparatus.

3. The inspection apparatus according to claim 1, wherein a respective data name of each piece of the image data includes the respective page number of the image data.

4. The inspection apparatus according to claim 1, wherein the page order information comprises information indicating an order of the received plurality of pieces of the image data, and the indicated order is based on an order of a plurality of images in the document data from which the plurality of pieces of the image data were generated.

5. The inspection apparatus according to claim 1, wherein the controller is further configured to receive a scanned image obtained by reading a printout with an image printed and inspect the printout based on the scanned image and the correct image.

6. An inspection system comprising:
an image processing apparatus; and
an inspection apparatus communicatively coupled to the image processing apparatus,
the image processing apparatus including a controller having one or more processors and one or more memories, the controller configured to:
   receive a first piece of data representing one or more pages,
   generate from the first piece of the data a plurality of pieces of second data each representing one page, and
   transmit the plurality of pieces of the second data in an order of being generated by the inspection apparatus,
the inspection apparatus including a second controller having one or more processors and one or more memories, the second controller configured to;
receive the plurality of pieces of the second data,
sort the plurality of pieces of the second data based on an order of the first data, and
register the sorted pieces of the second data as a reference image for inspection.

7. The inspection system according to claim 6, wherein the image processing apparatus is configured to transmit information about a page order of the first data to the inspection apparatus, and
the inspection apparatus is configured to sort the plurality of pieces of the second data in accordance with the information about the page order.

8. The inspection system according to claim 6, wherein the inspection apparatus includes a storage configured to store information about a page order, and
the inspection apparatus is configured to sort the plurality of pieces of the second data in accordance with the information about the page order.

9. The inspection system according to claim 6, wherein each piece of the second data is provided with a page number that is information about a page number assigned to the second data.

10. The inspection system according to claim 9, wherein a file name of each piece of the second data includes the page number.

11. A control method for an inspection apparatus configured to communicate with an image processing apparatus configured to generate image data based on document data, the inspection apparatus, the control method comprising:

receiving a plurality of pieces of image data in an order of being generated by the image processing apparatus, each piece of the image data representing one page, and each piece of the image data being provided with a page number;

receiving page order information of the image data;

rearranging the pieces of the image data based on the received page order information and the respective page number provided to each piece of the image data; and registering the rearranged pieces of the image data as a reference image for inspection.

12. A control method for an inspection system including an image processing apparatus and an inspection apparatus communicatively coupled to the image processing apparatus, the control method comprising:

causing the image processing apparatus to receive a first piece of data representing one or more pages;

causing the image processing apparatus to generate from the first piece of the data a plurality of pieces of second data each representing one page;

causing the image processing apparatus to transmit the plurality of pieces of the second data in an order of being generated by the inspection apparatus;

causing the inspection apparatus to receive the plurality of pieces of the second data, causing the inspection apparatus to sort the plurality of pieces of the second data based on an order of the first data, and causing the inspection apparatus to register the sorted pieces of the second data as a reference image for inspection.

* * * * *